United States Patent
Sinha et al.

(10) Patent No.: US 7,862,935 B2
(45) Date of Patent: Jan. 4, 2011

(54) MANAGEMENT VIA DYNAMIC WATER HOLDUP ESTIMATOR IN A FUEL CELL

(75) Inventors: Manish Sinha, Pittsford, NY (US); John C. Fagley, Victor, NY (US); Peter Willimowski, Rossdorf (DE); Steven G. Goebel, Victor, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1632 days.

(21) Appl. No.: 11/130,807

(22) Filed: May 17, 2005

(65) Prior Publication Data

US 2006/0263653 A1   Nov. 23, 2006

(51) Int. Cl.
*H01M 8/04*   (2006.01)
*H01M 8/00*   (2006.01)

(52) U.S. Cl. .................. 429/413; 429/400; 429/450; 429/414

(58) Field of Classification Search .................. None
See application file for complete search history.

(56) References Cited

U.S. PATENT DOCUMENTS

| | | | |
|---|---|---|---|
| 4,769,297 A | 9/1988 | Reiser et al. | |
| 5,441,819 A | 8/1995 | Voss et al. | |
| 5,503,944 A | 4/1996 | Meyer et al. | |
| 5,547,776 A * | 8/1996 | Fletcher et al. | 429/13 |
| 5,773,160 A | 6/1998 | Wilkinson et al. | |
| 6,117,577 A | 9/2000 | Wilson | |
| 6,376,111 B1 | 4/2002 | Mathias et al. | |
| 6,524,733 B1 | 2/2003 | Nonobe | |
| 6,528,194 B1 | 3/2003 | Condit et al. | |
| 6,562,501 B1 | 5/2003 | Nagamiya et al. | |
| 6,566,001 B2 | 5/2003 | Yosida et al. | |
| 2004/0170878 A1 | 9/2004 | Goebel | |

FOREIGN PATENT DOCUMENTS

| | | |
|---|---|---|
| JP | 6-245158 A | 9/1994 |
| JP | 9-128564 A | 5/1997 |

OTHER PUBLICATIONS

U.S. Appl. No. 11/130,804, filed May 17, 2005, Fagley et al., "Relative Humidity, Profile Control Strategy for High Current Density Stack Operation".
U.S. Appl. No. 11/130,806, filed May 17, 2005,Victor W. Logan, "Fuel Cell System Relative Humidity".
U.S. Appl. No. 11/130,825, filed May 17, 2005, Goebel et al., "Relative Humidity Control for a Fuel Cell".
Fagley, John; Gu, Wenbin; and Whitehead, Lee, "Thermal Modeling of a PEM Fuel Cell," pp. 141-149, published by ASME in "Fuel Cell Science, Engineering and Technology," June 2004.

* cited by examiner

*Primary Examiner*—Dah-Wei Yuan
*Assistant Examiner*—Angela Martin

(57) ABSTRACT

A strategy of controlling a state of hydration of a fuel cell(s) and actively managing operation of the fuel cell(s) to achieve a desired state of hydration. The control strategy monitors the state of hydration and a rate of change of the state of hydration which are used to control the operation of the fuel cell(s). A supervisory control strategy is implemented that alters the operating parameters of the fuel cell(s) based upon the state of hydration, the rate of change of the state of hydration, and a desired operational range for the state of hydration.

30 Claims, 2 Drawing Sheets

MANAGEMENT VIA DYNAMIC WATER HOLDUP ESTIMATOR IN A FUEL CELL

FIELD OF THE INVENTION

The present invention relates to fuel cells and, more particularly to controlling the operation of fuel cells based upon a state of hydration of the fuel cells.

BACKGROUND OF THE INVENTION

Fuel cells are used as a power source for electric vehicles, stationary power supplies and other applications. One known fuel cell is the PEM (i.e., Proton Exchange Membrane) fuel cell that includes a so-called MEA ("membrane-electrode-assembly") comprising a thin, solid polymer membrane-electrolyte having an anode on one face and a cathode on the opposite face. The MEA is sandwiched between a pair of electrically conductive contact elements which serve as current collectors for the anode and cathode, which may contain appropriate channels and openings therein for distributing the fuel cell's gaseous reactants (i.e., $H_2$ and $O_2$/air) over the surfaces of the respective anode and cathode.

PEM fuel cells comprise a plurality of the MEAs stacked together in electrical series while being separated one from the next by an impermeable, electrically conductive contact element known as a bipolar plate or current collector. In some types of fuel cells each bipolar plate is comprised of two separate plates that are attached together with a fluid passageway therebetween through which a coolant fluid flows to remove heat from both sides of the MEAs. In other types of fuel cells the bipolar plates include both single plates and attached together plates which are arranged in a repeating pattern with at least one surface of each MEA being cooled by a coolant fluid flowing through the two plate bipolar plates.

The fuel cells are operated in a manner that maintains the MEAs in a humidified state. The level of humidity or hydration of the MEAs affects the performance of the fuel cell. Too wet of an MEA limits the performance of the fuel cell stack. Specifically, formation of liquid water impedes the diffusion of gas to the MEAs, thereby limiting their performance. The liquid water also acts as a flow blockage reducing cell flow and causing even higher fuel cell relative humidity which can lead to unstable fuel cell performance. Additionally, the formation of liquid water within the cell may cause significant damage when the fuel cell is shut down and exposed to freezing conditions. That is, when the fuel cell is nonoperational and the temperature in the fuel cell drops below freezing, the liquid water therein will freeze and expand, potentially damaging the fuel cell. Too dry of an MEA also limits the performance. Specifically, as the humidity level decreases the protonic resistance of the MEA will start to increase (especially near the inlet), resulting in additional waste heat and lower production of electricity. Furthermore, durability data suggests that large cycling in the moisture content of the MEA that leads to repeated flooding and drying of membranes can lead to significant loss in durability due to membrane swelling and shrinking. Thus, repeated flooded and dry operating conditions lead to a loss of overall efficiency and may reduce the durability of the MEA and the fuel cell.

Accordingly, it is advantageous to control the operation of the fuel cell in a manner that allows for efficient operation of the fuel cell and/or minimizes an impact on the durability of the MEA and fuel cell. Prior control strategies to manage the operation of the fuel cell have focused on maintaining a cathode effluent relative humidity at a constant level. Such strategies, however, do not monitor the state of hydration of the fuel cell and/or fuel cell stack (i.e., how much water buffer is in the membrane, diffusion media and channels). Additionally, the prior control strategies do not actively manage process excursions that may lead to drying and flooding of the fuel cell and/or fuel cell stack.

SUMMARY OF THE INVENTION

The present invention monitors a state of hydration of the fuel cell and/or fuel cell stack and controls operation of the fuel cell and/or fuel cell stack based upon the state of hydration. The rate of change of the state of hydration is also monitored and used to control the operation of the fuel cell and/or fuel cell stack. A supervisory control strategy is implemented that alters the operating parameters of the fuel cell and/or fuel cell stack based upon the state of hydration, the rate of change of the state of hydration and a desired operational range for the state of hydration. Accordingly, the control strategy of the present invention actively manages process excursions that may lead to drying and flooding of the fuel cell and/or fuel cell stack.

A method of operating a fuel cell according to the principle of the present invention includes: (1) monitoring a state of hydration of the fuel cell; and (2) adjusting an operating parameter of the fuel cell based upon the state of hydration.

In another aspect of the present invention, a method of operating a fuel cell system having a fuel cell stack is disclosed. The method includes: (1) ascertaining a current state of hydration of the fuel cell stack; (2) ascertaining a current rate of change of the state of hydration of the fuel cell stack; and (3) adjusting an operating parameter of the fuel cell stack based upon the current state of hydration and the current rate of change of the state of hydration.

In yet another aspect of the present invention, a method of operating a fuel cell system having a fuel cell stack operable to convert a cathode reactant flowing through a cathode flow path and an anode reactant flowing through an anode flow path into electrical energy is disclosed. The method includes: (1) ascertaining a current state of hydration of the fuel cell stack; (2) ascertaining a current rate of change of the state of hydration of the fuel cell stack; (3) comparing the current state of hydration to a predetermined standard or range; (4) determining a target cathode effluent relative humidity based on the comparison; and (5) adjusting an operating parameter of the fuel cell stack based on the target cathode effluent relative humidity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
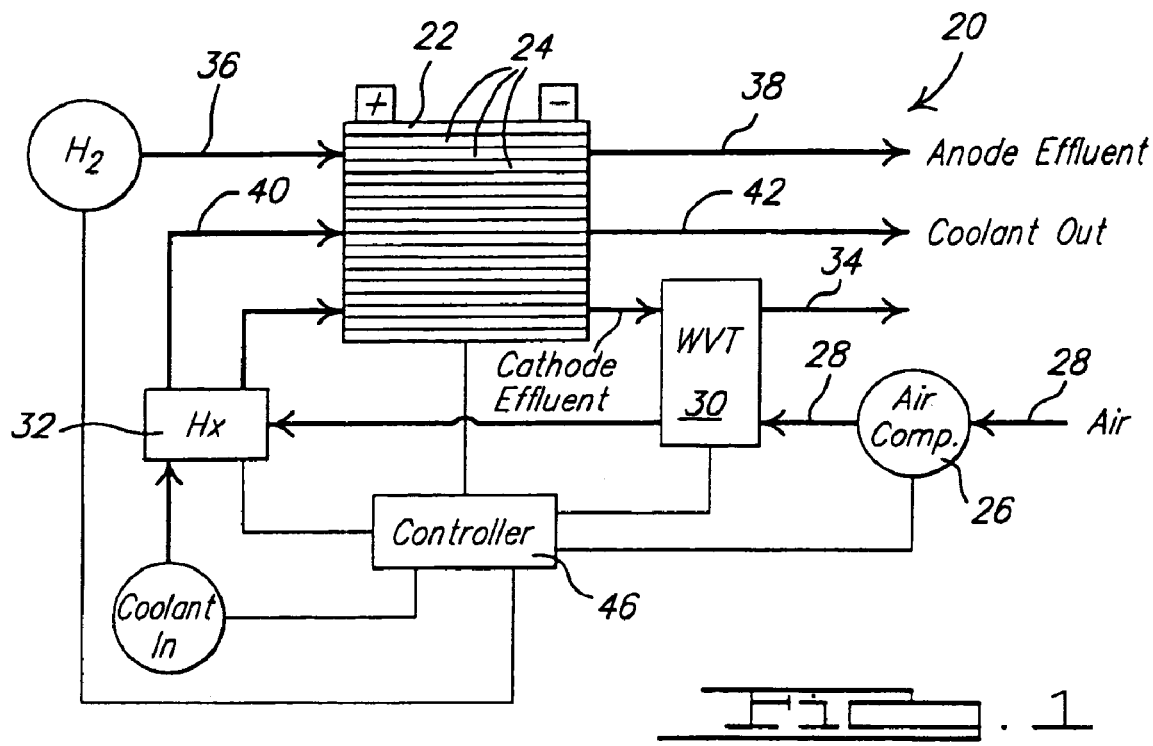
FIG. 1 is a schematic representation of an exemplary fuel cell system in which the control strategy of the present invention can be utilized.

An exemplary fuel cell system 20 in which the control strategy according to the principle of the present invention can be used is illustrated in FIG. 1. Fuel cell system 20 includes a fuel cell stack 22 which is comprised of a plurality of fuel cells 24 arranged adjacent one another to form stack 22. Fuel cells 24 include membrane-electrode-assemblies (MEAs) separated from each other by electrically conductive, liquid-cooled bipolar separator plates. The fuel cells 24 that are on the ends of stack 22 are disposed between terminal plates and end contact fluid distribution elements. The end fluid distribution elements as well as the working faces or sides of each bipolar plate contain a plurality of lands adjacent to grooves or channels on the active faces and form flow fields (flow paths) for distributing anode and cathode reactants (i.e., $H_2$ and $O_2$/air) to the MEAs. Gas-permeable conductive diffusion media press up against the electrode faces of the MEAs and between end contact fluid distribution elements and terminal collector plates to provide a conductive pathway therebetween when the stack is compressed during normal operating conditions.

Cathode reactant, in this case in the form of air, is supplied to the cathode flow field of fuel cell stack 22 via compressor 26 and cathode supply plumbing 28. Alternatively, the cathode reactant can be supplied from a pressurized storage tank (not shown). The cathode reactant gas flows from compressor 26 through a humidifying device 30, in this case in the form of a water vapor transfer (WVT) device wherein the cathode reactant gas is humidified. The cathode reactant gas then flows through an optional heat exchanger 32 wherein the cathode reactant gas can be heated or cooled, as needed, prior to entering fuel cell stack 22.

The cathode reactant gas then flows through the cathode reactant flow fields (cathode flow path) of fuel cell stack 22 and exits fuel cell stack 22 in the form of cathode effluent via cathode exhaust plumbing 34. The cathode effluent is routed through WVT device 30.

Within WVT device 30, humidity from the cathode effluent stream is transferred to the cathode reactant gas being supplied to fuel cell stack 22. The operation of WVT device 30 can be adjusted to provide differing levels of water vapor transfer between the cathode effluent stream and the cathode reactant stream.

Anode reactant in the form of $H_2$ is supplied to the anode flow fields (anode flow path) of fuel cell stack 22 via anode supply plumbing 36. Anode reactant gas can be supplied from a storage tank, a methanol or gasoline reformer, or the like. The anode reactant flows through the anode reactant flow path and exits fuel cell stack 22 in the form of anode effluent via anode exhaust plumbing 38.

Coolant is supplied to the coolant flow path within fuel cell stack 22 via coolant supply plumbing 40 and is removed from fuel cell stack 22 via coolant exit plumbing 42. The coolant flowing through fuel cell stack 22 removes heat generated therein by the reaction between the anode and cathode reactants. The coolant can also control the temperature of the cathode reactant and/or cathode effluent as it travels throughout the cathode reactant flow path within fuel cell stack 22. Optionally, the coolant can flow through heat exchanger 32 prior to entering fuel cell stack 22 thereby equalizing the temperature of the cathode reactant gas and the coolant prior to entering fuel cell stack 22. In this manner, the temperature of the cathode reactant flowing into the fuel cell stack 22 can be controlled to a desired set point. The coolant and cathode reactant equalize to a same temperature very quickly within fuel cell stack 22. Accordingly, the temperature of the cathode gas is substantially the same as the temperature of the coolant as the flows progress through fuel cell stack 22.

A controller 46 communicates with the various components of fuel cell system 20 to control and coordinate their operation. For example, controller 46 communicates with compressor 26 to control the stoichiometric quantity of cathode reactant supplied to fuel cell stack 22. Controller 46 also communicates with WVT device 30 to control the humidification of the cathode reactant flowing into fuel cell stack 22. Controller 46 communicates with heat exchanger 32 to control the temperature of the cathode reactant flowing into fuel cell stack 22. Controller 46 also communicates with the coolant supply system to control the flow rate of coolant through fuel cell stack 22 and also the temperature of the coolant routed through fuel cell stack 22. Controller 46 also communicates with the anode reactant supply system to control the quantity of anode reactant supplied to fuel cell stack 22.

Controller 46 may be a single controller or multiple controllers whose actions are coordinated to provide a desired overall operation of fuel cell system 20. Furthermore, controller 46 may include one or more modules, as needed, to perform the functionality indicated. As used herein, the term "module" refers to an application specific integrated circuit (ASIC), an electronic circuit, a processor (shared, dedicated or group) and memory that execute one or more software or firmware programs, a combinational logic circuit, or other suitable components that provide the desired functionality.

The present invention provides a strategy for controlling the state of hydration or moisture content of the membranes and other soft goods of fuel cells 24 within fuel cell stack 22. The desired operating conditions of fuel cell stack 22 and fuel cell system 20 are typically defined in terms of intervals of process conditions, such as pressure, temperature, stoichiometry and relative humidity within the stack. The resulting multi-variable space (operating condition space or OCS) defines the steady state normal operating boundary that results in best performance and durability of fuel cell stack 22. Transient operation often results in stack conditions outside the OCS resulting in drying or wetting of the stack, the membrane and the soft goods. For example, the temperature falling below the OCS boundary causes reduction in water carrying capacity of cathode effluent and eventually results in water accumulation within fuel cell stack 22 leading to stack flooding. Similarly, temperature rising above the OCS boundary causes more water to be removed via cathode effluent than is being generated by reaction and leads to membrane drying. Similar excursions in pressure, stoichiometry and inlet relative humidity of the cathode reactant or any combination may also lead to flooding or drying of fuel cell stack 22. As stated above, both flooding and drying conditions may lead to a loss of performance of fuel cell stack 22. Moreover, cycling between these conditions has been shown to have a detrimental effect on the durability of fuel cell stack 22 due to membrane swelling and shrinking.

Excursions outside the OCS boundary are expected to happen in a real system due to dynamic limitations of components in following the load profile in a typical drive cycle. The loss of performance and durability are not directly due to excursions in process conditions but rather the effect that excursions in process conditions have on the water accumulation or holdup within the stack. To address this, the present invention uses a supervisory control strategy that monitors the state of hydration (SOH) of fuel cell stack 22 and manages the desired set point for the stack relative humidity to maintain the water holdup within the membranes of fuel cell stack 22 within an optimal range.

Figure 2:
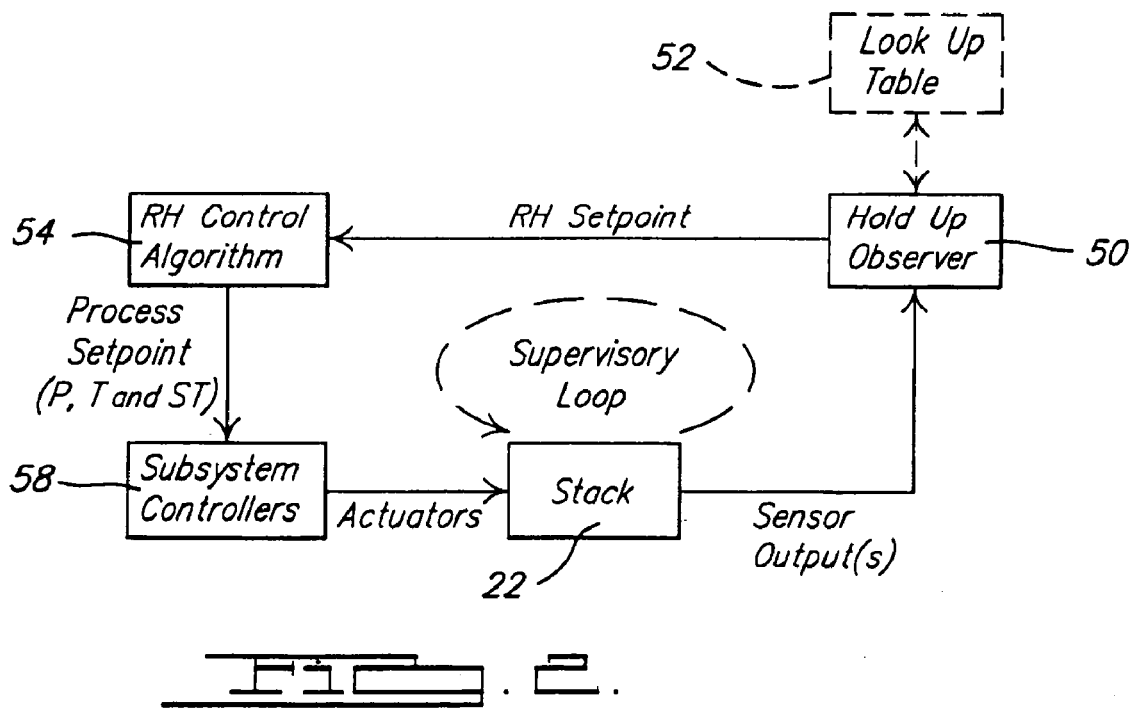
FIG. 2 is a schematic representation of the supervisory approach for managing the state of hydration of a fuel cell stack according to the principle of the present invention.

Referring now to FIG. 2, a schematic representation of the supervisory loop employed by controller 46 to control the operation of fuel cell stack 22 and fuel cell system 20 according to the methods of the present invention is shown. The operational parameters of fuel cell stack 22 are monitored by various sensors and the output from those sensors is communicated to a holdup observer module 50. For example, the inlet and outlet pressures of the cathode gas flowing into/out of the cathode flow path, the inlet and outlet coolant temperatures, the stoichiometric quantity (ST) of cathode and anode reactant flowing into fuel cell stack 22, and the relative humidity of the cathode and anode reactant flowing into fuel cell stack 22 are communicated to holdup observer module 50. Holdup observer module 50 uses an estimator for the state of hydration and also determines the rate of change of the state of hydration which is used to adjust or control the operation of fuel cell stack 22 to provide the desired performance. Based on the state of hydration and the rate of change, holdup observer module 50 determines a target set point for the cathode effluent relative humidity, as described below.

The fuel cell state of hydration (SOH) is a measure of total water uptake ($M_w$) in the fuel cell which includes water in the membrane and the diffusion media. Membrane hydration is defined as the ratio of water molecules per sulfonic group ($\lambda$) in a nafion membrane used in a PEM fuel cell. Variations in $\lambda$ affects the membrane's proton conductivity and can be measured via a high frequency resistance (HFR) of fuel cell stack 22. The extent of water holdup in diffusion media (DM) is defined as $\theta$. The parameter $\theta$ is a measure of the amount of water in the DM relative to the maximum amount of water uptake in the DM, and takes value between 0 and 1. The water holdup in diffusion media starts only after the membrane is complete saturated, i.e. $\lambda=\lambda_{max}$, where $\lambda_{max}$ is determined by the material property (such as density of sulphonic acids) of the membrane. In other words $\theta$ is greater than 0 only when $\lambda=\lambda_{max}$ and $\lambda$ is less than $\lambda_{max}$ only when $\theta=0$. Thus, variation in partial hydration of the membrane can be detected and estimated via HFR of fuel cell stack 22. However, when the membrane is flooded with water and the water accumulation is occurring in the diffusion media and/or channels of the fuel cells 24, the HFR signal is not able to measure variations in $\lambda$. In other words, the HFR signal is no longer indicative of changes occurring in $\lambda$ once the membrane has been flooded. Accordingly, the HFR measurement may be used during certain operational conditions to determine a state of hydration or a measure of $\lambda$ which can be used to control the operation of fuel cell stack 22 and fuel cell system 20, as described in more detail below. The measurement of HFR is explained in detail in U.S. Pat. No. 6,376,111 entitled "System and Method for Controlling the Humidity Level of a Fuel Cell," the disclosure of which is incorporated herein by reference.

Holdup observer module 50 is operable to estimate a state of hydration of the fuel cell membrane and to estimate a rate of change of the state of hydration as a function of time. The estimated state of hydration can be determined in a number of ways, as described below. The estimated rate of change of the state of hydration is calculated using a formula that takes into account the water flowing in, the water generated within, and the water flowing out of fuel cell stack 22, as described in more detail below. Based upon the estimated state of hydration and the estimated rate of change of the state of hydration, operation of fuel cell stack 22 is adjusted to provide an optimal or desired operating performance.

During operation of fuel cell stack 22, an initial estimate or determination of the state of hydration of the membranes within fuel cell stack 22 is needed. This initial state of hydration can be determined in a number of manners. A first method of determining the initial state of hydration is based upon a previous operation of fuel cell stack 22. Specifically, during a previous operation of fuel cell stack 22, the shutdown procedure utilized to cease the operation of fuel cell stack 22 is controlled to provide a desired ending state of hydration for the fuel cell stack. This ending state of hydration is then used as the initial state of hydration for fuel cell stack 22 upon a subsequent startup of operation. The state of hydration of fuel cell stack 22 should not change during the nonuse period because there is no gas flow through the anode and cathode flow fields.

A second way of determining the initial state of hydration is by measuring the HFR of fuel cell stack 22 initially upon startup. The measure of HFR is indicative of the state of hydration and, thus, yields an initial state of hydration that can be utilized when starting the fuel cell stack. It should be appreciated, however, that this method is only applicable when fuel cell stack 22 is not in a flooded condition. Accordingly, if fuel cell stack 22 initially begins operation in a flooded condition, the use of an HFR measurement to determine the initial state of hydration is not feasible.

A third way of determining the initial state of hydration is to allow operation of the fuel cell stack 22 to begin under conditions that would lead to flooding of the stack after a short period of time (e.g., 5-10 seconds). The initial state of hydration is assumed to be 100% which corresponds to a flooded condition. The use of such an assumption will not be too far off from an actual measure of the state of hydration and, accordingly, can be used to assume the initial state of hydration. When this method is employed, continued operation of fuel cell stack 22 will typically reduce the state of hydration of fuel cell stack 22 and will depart from the flooded condition.

Thus, holdup observer module 50 is operable to determine an initial state of hydration of fuel cell stack 22 through either a previous state of hydration at shut down, a measure of HFR, or by assuming a flooded condition and an initial SOH of 100%.

With the initial state of hydration ascertained, holdup observer module 50 can continue to monitor the state of hydration of fuel cell stack 22 during operation. Specifically, holdup observer module 50 calculates a rate of change of the state of hydration and uses that rate of change to dynamically adjust the state of hydration of fuel cell stack 22, as described below. The rate of change of the state of hydration can be calculated using the following equation:

$$\frac{dM_w}{dt} = \frac{x_{in}^w}{(1-x_{in}^w)}n_{in}^a + \frac{jA}{2F} - \frac{x_{out}^w}{(1-x_{out}^w)}n_{out}^a \qquad (1)$$

where:
$M_w$=holdup of water in the fuel cell [moles/cell];
$X_{in}^w$=mole fraction of water in the inlet cathode reactant stream (function of inlet RH);
$n_{in}^a$=molar flow rate of cathode reactant on a dry basis at the inlet [moles/cell];
jA=current density*area of fuel cell (total current) [Amps];
F=Faradays constant [mole e$^-$/Amp];
$X_{out}^w$=mole fraction of water in the cathode effluent (function of outlet RH); and
$n_{out}^a$=molar flow rate of cathode effluent on a dry basis [mole/sec].

The first term of equation (1) on the right hand side captures the water that is entering fuel cell stack 22 with the cathode reactant, the middle term captures the water generated within the fuel cells 24 and fuel cell stack 22 during operation, and the third term captures the water leaving fuel cell stack 22 in the cathode effluent. By using equation (1), holdup observer module 50 can determine the rate of change of overall water holdup in the fuel cell or in other words the state of hydration. Note that $M_w$ is sum of water in the membrane (function of $\lambda$) and water in the diffusion media (function of $\theta$).

Holdup observer module 50 uses the immediately preceding state of hydration in conjunction with the immediately preceding rate of change of the state of hydration to determine the current state of hydration for fuel cell stack 22. Specifically, the following equation can be used to determine the current state of hydration:

$$M_{wt_n} = M_{wt_{n-1}} + \frac{dM_{wt_{n-1}}}{dt} * (t_n - t_{n-1}) \quad (2)$$

where:
$t_n$=current time of interest to make a determination;
$t_{n-1}$=previous time at which a determination was made; and
$t_n-t_{n-1}$=elapsed time between determinations.

Thus, utilizing the previously determined water uptake in the fuel cell, the previously determined rate of change of water uptake in the fuel cell and the time interval between the previous determinations and the current time of interest, the current state of hydration can be determined.

Holdup observer module 50, at certain operating conditions of fuel cell stack 22, can verify the determination of the state of hydration. Specifically, during periods when the membrane is less than 100% humidified, holdup observer module 50 can utilize a measure of the HFR of fuel cell stack 22 to verify the determined state of hydration. As stated above, the HFR measurement is directly correlated to the state of hydration of the membrane when the membrane is less than 100% hydrated. Thus, during periods when fuel cell stack 22 is operating in a non-flooded state, holdup observer module 50 can determine the actual state of hydration based upon the HFR and correct the calculated state of hydration based upon equation (2). This corrected state of hydration is utilized in a future determination of the state of hydration at the next period of interest. Thus, the estimated state of hydration can be reset or adjusted whenever the conditions lead to partial humidification of the membrane and the HFR can be measured.

Holdup observer module 50 compares the ascertained state of hydration to a predetermined standard or range of desired state of hydration for the operation of fuel cell stack 22. Based on this comparison, corrective action may be taken to maintain or to achieve the state of hydration within the predetermined standard or range, as described in more detail below. Holdup observer module 50 ascertains a target RH set point for the cathode effluent exiting fuel cell stack 22 based upon the state of hydration and the rate of change of the state of hydration relative to the predetermined standard or range. Holdup observer module 50 uses a PI algorithm or a PID algorithm to determine the target RH set point for the cathode effluent. The algorithm takes into account how closely the state of hydration is to the predetermined standard or range. The algorithm also takes into account the rate at which the state of hydration is changing and the direction in which the state of hydration is changing in determining the RH set point.

As the current state of hydration approaches an upper or lower limit of the desired operational range, the corrective action can become more drastic, depending upon the rate of change of the state of hydration and the direction in which the state of hydration is changing. For example, when the state of hydration is increasing toward the upper limits, and the rate of change indicates that the state of hydration is going to continue to increase, a more drastic corrective action can be taken than when the rate of change of the state of hydration indicates that the state of hydration is decreasing. Additionally, the targeted RH set point for the cathode effluent may also take into account the current operational power level of fuel cell stack 22. For example, when high current density operation is occurring, a lower RH set point may be targeted due to non-equilibrium in humidity between the MEA and the cathode gas in the cathode flow path. Conversely, during low power operation a higher RH set point may be targeted due to the membrane humidity being closer to the relative humidity of the cathode gas in the flow channels.

The specific algorithm used by holdup observer module 50 will vary depending upon the design of fuel cell stack 22, and fuel cell system 20. For example, various fuel cell stacks and/or fuel cell systems may have components that have different dynamic limitations and responses in following the load profiles in a typical drive cycle for the fuel cell system and/or stack. Additionally, the fuel cell stack and/or fuel cell system may also have different anticipated drive cycles, depending upon their use, that can also affect the algorithms chosen. For example, when fuel cell stack 22 is used as a stationary power supply, the power demand may be relatively constant. In contrast, when the fuel cell stack is used on a vehicle the power demand may be extremely dynamic and constantly changing. These differing types of fuel cell stacks may have different dynamic characteristics to achieve a desired operation and, accordingly, require different control algorithms to maintain the state of hydration within a desired interval or range.

As an alternative to the use of a PI or PID control algorithm, holdup observer module 50 can use a look-up table module 52 to determine the appropriate RH set point for the cathode effluent exiting fuel cell stack 22 based upon the state of hydration, the rate of change of the state of hydration and the predetermined standard or range for the state of hydration. Look-up table module 52 contains various tables that provide an appropriate RH set point for the cathode effluent based upon the operating parameters of fuel cell stack 22 including the current state of hydration and the current rate of change of the state of hydration. The data within the look-up tables are based upon empirical data gathered from operation of fuel cell stack 22 or an equivalent fuel cell stack. Thus, the look-up table provides the desired relative humidity set point for the cathode effluent.

Holdup observer module 50 communicates the target RH set point for the cathode effluent to an RH control algorithm module 54. Control algorithm module 54 ascertains appropriate changes/adjustments to the operating parameters (such as cathode pressure in/out, coolant temperature in/out, cathode stoichiometry, and cathode inlet RH) of fuel cell stack 22 to achieve the targeted RH set point for the cathode effluent. The targeted RH set point and the adjustments to meet the targeted RH set point are intended to achieve a state of hydration in fuel cell stack 22 that matches or is within the predetermined standard or range that provides a desired operation of fuel cell stack 22. The changes and adjustments also take into account the power demand placed on fuel cell stack 22.

RH control algorithm module 54 sends the appropriate changes/adjustments to the operating parameters to a subsystem controllers module 58. Subsystem controllers module 58 is operable to adjust the actuators and/or components of fuel cell stack 22 to impart the appropriate changes/adjustments to the operating parameters of the fuel cell stack. For example, subsystem controllers module 58 can control the rate of coolant flowing through fuel cell stack 22 and the temperature at which the coolant enters and exits the fuel cell stack. Furthermore, subsystem controllers module 58 can control the operation of compressor 26 to allow adjustments to the stoichiometric quantity of cathode reactant flowing into fuel cell stack 22. Subsystem controllers module 58 can also control the pressure drop that occurs through the cathode flow path by adjusting operation of compressor 26 or various valves or pressure regulators (not shown) in the cathode flow path. Subsystem controllers module 58 can also control the operation of WVT device 30 to adjust the relative humidity of the cathode reactant flowing into fuel cell stack 22. Subsystem controllers module 58 can also control the operation of an optional heat exchanger 32 to provide a desired inlet temperature for the cathode reactant. Accordingly, subsystem controllers module 58 can adjust various operating parameters of fuel cell stack 22. Control algorithm module 54 communicates with subsystem controllers module 58 to provide input that the subsystem controllers module 58 uses to adjust the operating parameters of fuel cell stack 22 to achieve the targeted RH set point and the desired state of hydration.

Accordingly, in the supervisory control loop of the present invention, holdup observer module 50 monitors the process conditions within fuel cell stack 22, determines a state of hydration (holdup of water) within the stack along with the rate of change of the state of hydration and determines a target relative humidity set point for the cathode effluent. As the state of hydration approaches and/or rises above a desired set point or upper range value, the target relative humidity set point for the cathode effluent flowing out of fuel cell stack 22 is reduced. As the state of hydration approaches and/or falls below a desired set point or lower range value, the target relative humidity set point for the cathode effluent flowing out of fuel cell stack 22 is increased. How fast and how much the relative humidity set point is modified depends on the extent of process excursions outside the OCS or, in effect, how much the state of hydration has and is deviating from its optimal or desired state. Thus, this approach enables maintenance of the state of hydration within the desired interval even when the process conditions are outside of the OCS.

Figure 3:
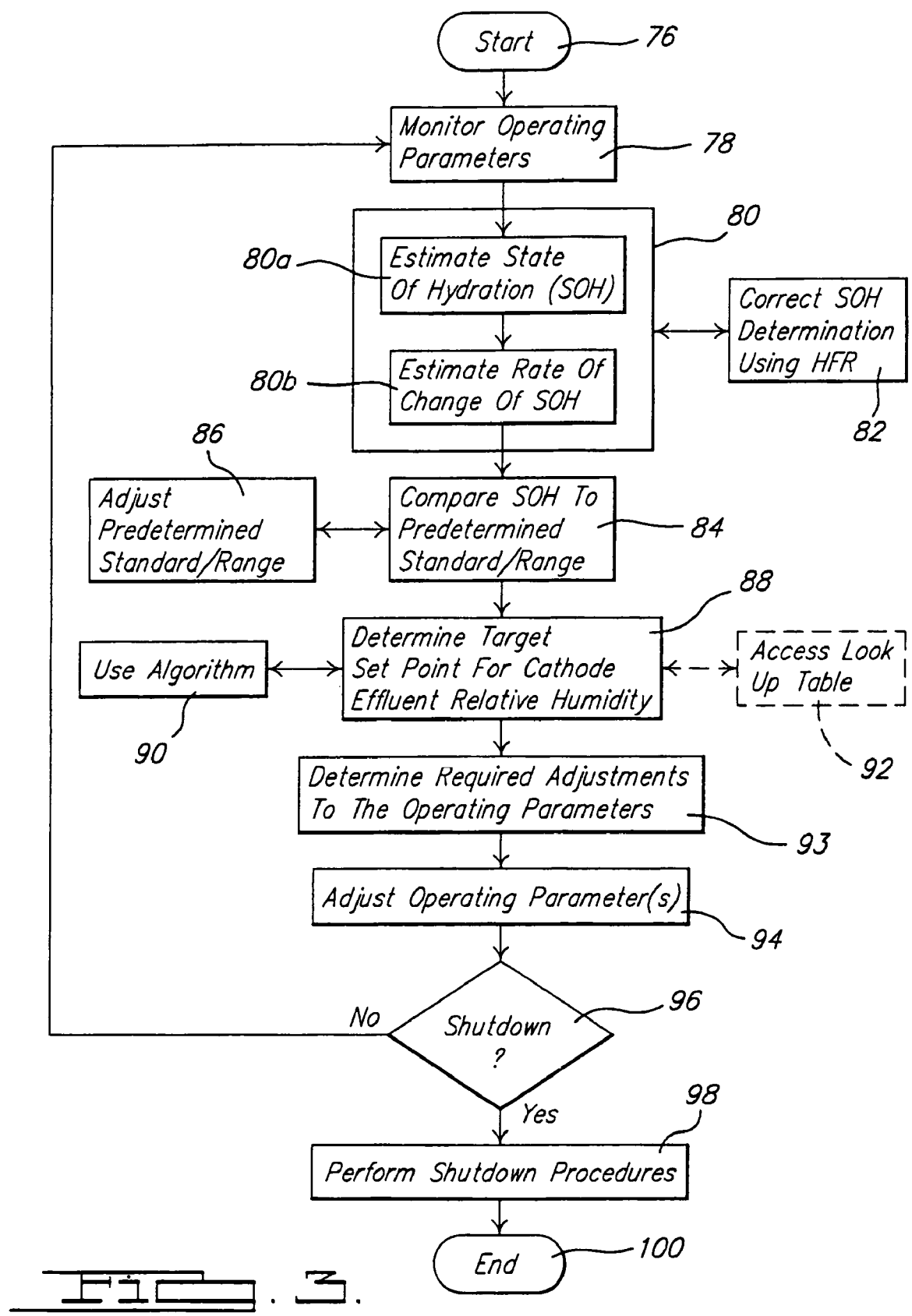
FIG. 3 is a flow chart illustrating the control strategy of the present invention.

Referring now to FIG. 3, a simplified flow chart of the control strategy used in the present invention is shown. The control strategy begins with the starting of the fuel cell stack, as indicated in block 76. The operating parameters of fuel cell stack 22 are monitored, as indicated in block 78. Holdup observer module 50 uses the operating parameters to determine the current state of hydration and the current rate of change of the state of hydration of fuel cell stack 22, as indicated in block 80.

At startup, an initial state of hydration is used as the current state of hydration. As stated above, the initial state of hydration can be determined by using a previous state of hydration of the fuel cell stack upon a previous shutdown, a measure of high frequency resistance, or operating the fuel cell stack to a flooded state and using an initial state of hydration of 100%. During nominal operation of fuel cell stack 22, the determination of the state of hydration is performed by using equation (2), as described above. Optionally, the current state of hydration can be corrected by using a measure of the high frequency resistance, as indicated in block 82 and discussed above. With the state of hydration determined, as indicated in block 80*a*, the rate of change of the state of hydration is determined, as indicated in block 80*b*. The rate of change of the state of hydration is determined using equation (1), as described above.

The current state of hydration is compared to a predetermined standard or range, as indicated in block 84. The predetermined standard or range is chosen to provide a desired and/or optimal operation of fuel cell stack 22. For example, the state of hydration can be chosen to provide high current density operation of fuel cell stack 22. The predetermined standard or range can be based upon a standardized polarization curve or a performance curve for the particular fuel cell stack.

Alternatively, the predetermined standard or range can be trimmed or adjusted based upon the specific previous operating performance of fuel cell stack 22, as indicated in block 86. The adjustment to the predetermined standard or range can be done by comparing the instantaneous voltage and electric current information for fuel cell stack 22 against a previously achieved best or optimal operating performance. The previously achieved performance can be based upon the last few days, weeks, or for an entire history of operation of the fuel cell stack. By adjusting the predetermined standard or range to use the best recent operating information as opposed to a standardized polarization curve, loss of performance with time or departures of the particular stack performance from standard can be taken into account. The result is that the predetermined standard or range can be chosen to provide optimal performance for the particular capabilities of fuel cell stack 22 and account for changes in those capabilities over time.

Upon comparing the state of hydration to the predetermined standard or range, a target relative humidity set point for the cathode effluent flowing out of fuel cell stack 22 is determined, as indicated in block 88. Holdup observer module 50 can determine the relative humidity set point using algorithm(s), as shown in block 90, or, alternatively, through the use of look-up table module 52, as indicated in block 92.

After determining the targeted relative humidity set point for the cathode effluent, RH control algorithm module 54 determines the required adjustments to the operating parameters of fuel cell stack 22, as indicated in block 93. Subsystem controllers module 58 then adjusts the operating parameters, as indicated in block 94, pursuant to the required adjustments determined by RH control algorithm module 54.

As fuel cell stack 22 and fuel cell system 20 continue to be operated, as indicated in decision block 96, the supervisory loop continues to be active and the control methodology indicated in blocks 78 through 94 continue to occur. When fuel cell stack 22 is being shut down, as indicated by decision block 96, controller 46 implements a shutdown procedure, as indicated in block 98. The shutdown procedures can vary depending upon the particular fuel cell stack 22 and the use to which fuel cell stack 22 is subjected. For example, if fuel cell stack 22 is subjected to a freezing environment, the shutdown procedure may seek to remove a certain quantity of water or to obtain a certain state of hydration of fuel cell stack 22 prior to being shut down to avoid damage caused by freezing conditions. The shutdown procedure may include obtaining or achieving a desired state of hydration for fuel cell stack 22. When a specific state of hydration is achieved, this information can be used in subsequent operation of fuel cell stack 22 as the initial state of hydration upon startup of operation, as discussed above. After performing the shutdown procedures, operation of fuel cell stack 22 ends, as indicated in block 100.

Accordingly, the operation of a fuel cell stack utilizing the methods of the present invention allows high current density operation and actively manages excursions outside the OCS.

This in turn enables operation at higher efficiency and also helps low power instability issues associated with fuel cell flooding. Moreover, this approach minimizes the impact of process condition excursions on the durability of the fuel cells within fuel cell stack 22. Additionally, this control approach minimizes the cycling between flooded and dry conditions even during the transients associated with a fuel cell stack utilized in a vehicle drive cycle. Thus, the present control strategy advantageously considers the dynamic impact of process excursions on the fuel cell performance and actively managing these process excursions. The actively managing of these process excursions provides superior performance than previously utilized steady state oriented control approaches.

While the present invention has been shown and described with reference to a specific fuel cell system 20 and supervisory control loop, it should be appreciated that variations can be made without departing from the spirit and scope of the present invention. For example, the mechanization of fuel cell system 20 can vary from that shown. Fuel cell system 20 may utilize devices other than WVT device 30 and/or heat exchanger 32 to provide those functionalities. Furthermore, while the present invention has been disclosed as providing a targeted relative humidity set point for the cathode effluent exiting the fuel cell stack 22, it should be appreciated other parameters, such as cathode in/out pressure, cathode stoichiometry, cathode inlet RH and coolant temperature in/out, can have a targeted set point to achieve a desired operation of fuel cell stack 22 while the remaining parameters are adjusted to meet the targeted set point. In addition, the holdup model as described earlier could additionally contain terms for anode inlet and anode outlet. Thus, the description of the invention is merely exemplary in nature and variations that do not depart from the gist of the invention are intended to be within the scope of the invention. Such variations are not to be regarded as a departure from the spirit and scope of the invention.

What is claimed is:

1. A method of operating a fuel cell comprising:
   (a) monitoring a state of hydration of the fuel cell, including monitoring a rate of change of said state of hydration; and
   (b) adjusting an operating parameter of the fuel cell based upon said state of hydration.

2. The method of claim 1, wherein (b) includes adjusting an operating parameter of the fuel cell based upon said state of hydration and said rate of change of said state of hydration.

3. The method of claim 2, wherein monitoring a rate of change of said state of hydration includes calculating a rate of change of said state of hydration based upon an equation that predicts said rate of change of said state of hydration.

4. The method of claim 3, wherein calculating said rate of change of said state of hydration includes accounting for water entering the fuel cell, water generated in the fuel cell, and water leaving the fuel cell.

5. The method of claim 2, wherein (a) includes estimating a state of hydration of the fuel cell at a first time $t_1$ by taking a previously estimated rate of change of said state of hydration at a second time $t_2$ multiplied by a time difference between $t_1$ and $t_2$ and adding a previously estimated state of hydration at said second time $t_2$.

6. The method of claim 1, further comprising comparing said state of hydration to a predetermined standard or range and wherein (b) includes adjusting said operating parameter based upon said comparison.

7. The method of claim 6, further comprising adjusting said predetermined standard or range based upon a previous operating performance of the fuel cell.

8. The method of claim 7, wherein adjusting said predetermined standard or range includes comparing an instantaneous voltage and electrical current generation of the fuel cell to a previously achieved optimal voltage and electrical current generation of the fuel cell.

9. The method of claim 1, wherein (a) includes determining an initial state of hydration of the fuel cell at start up based upon a high frequency resistance of the fuel cell.

10. The method of claim 1, wherein (a) includes determining an initial state of hydration of the fuel cell at start up based upon an ending state of hydration of the fuel cell at a previous shutdown of operation of the fuel cell.

11. A method of operating a fuel cell comprising:
    (a) monitoring a state of hydration of the fuel cell including estimating an initial state of hydration of the fuel cell as 100%;
    (b) adjusting an operating parameter of the fuel cell based upon said state of hydration;
    starting up operation of the fuel cell from a cold condition; and
    allowing the fuel cell to flood following said cold start up.

12. The method of claim 1, further comprising:
    determining a high frequency resistance of the fuel cell;
    ascertaining a state of hydration of the fuel cell based upon said high frequency resistance;
    comparing said monitored state of hydration with said ascertained state of hydration based upon said high frequency resistance; and
    adjusting said state of hydration based upon said comparison.

13. The method of claim 1, wherein (b) includes determining a target cathode effluent relative humidity based upon said state of hydration and adjusting an operating parameter based on said target cathode effluent relative humidity.

14. The method of claim 1, wherein (b) includes using an algorithm and said state of hydration to determine an adjustment to an operating parameter of the fuel cell.

15. The method of claim 1, wherein (b) includes using a look-up table and said state of hydration to determine an adjustment to an operating parameter of the fuel cell.

16. The method of claim 1, wherein (b) includes adjusting one or more of a relative humidity of a cathode reactant flowing into the fuel cell, a coolant temperature flowing through the fuel cell, a pressure of a cathode reactant in the fuel cell, and stoichiometric quantity of cathode reactant flowing into the fuel cell.

17. The method of claim 1, wherein (b) includes adjusting an operating parameter of the fuel cell to maintain said state of hydration in a predetermined range.

18. A method of operating a fuel cell stack comprising:
    (a) monitoring a state of hydration of the fuel cell stack including ascertaining a current state of hydration of the fuel cell stack and ascertaining a current rate of change of said state of hydration of the fuel cell stack;
    (b) adjusting an operating parameter of the fuel cell stack based upon said state of hydration, including adjusting an operating parameter of the fuel cell stack based upon said current state of hydration and said current rate of change of said state of hydration and said current rate of change of said state of hydration; and
    allowing the fuel cell stack to flood following said start up.

19. The method of claim 18, wherein (a) includes ascertaining a current state of hydration based upon a previously ascertained state of hydration and a previously ascertained rate of change of said state of hydration.

20. The method of claim 19, wherein (a) includes ascertaining a current state of hydration at a first time $t_1$ by taking a previously ascertained rate of change of said state of hydration at a second time $t_2$ multiplied by a time difference between $t_1$ and $t_2$ and adding a previously ascertained state of hydration at said second time $t_2$.

21. The method of claim 18, further comprising comparing said current state of hydration to a predetermined standard or range and wherein (b) includes adjusting said operating parameter based upon said comparison.

22. The method of claim 21, further comprising adjusting said predetermined standard or range based upon a previous operating performance of the fuel cell stack.

23. The method of claim 18, wherein (a) includes ascertaining an initial state of hydration of the fuel cell stack at start up based upon a high frequency resistance of the fuel cell stack.

24. The method of claim 18, wherein (a) includes ascertaining an initial state of hydration of the fuel cell stack at start up based upon an ending state of hydration of the fuel cell stack at a previous shutdown of operation of the fuel cell stack.

25. The method of claim 18, further comprising:
starting up operation of the fuel cell stack; and
wherein (a) includes estimating an initial state of hydration of the fuel cell stack as 100%.

26. The method of claim 18, further comprising:
ascertaining a high frequency resistance of one or more fuel cells in the fuel cell stack; and
adjusting said ascertained current state of hydration based upon said high frequency resistance.

27. The method of claim 18, wherein (b) includes determining a target cathode effluent relative humidity based upon said current state of hydration and said current rate of change of said state of hydration and adjusting an operating parameter of the fuel cell stack based on said target cathode effluent relative humidity.

28. The method of claim 18, wherein (b) includes using an algorithm and said current state of hydration and said current rate of change of said state of hydration to determine an adjustment to an operating parameter of the fuel cell stack.

29. The method of claim 18, wherein (b) includes using a look-up table and said current state of hydration and said current rate of change of said state of hydration to determine an adjustment to an operating parameter of the fuel cell stack.

30. The method of claim 18, wherein (b) includes adjusting one or more of a relative humidity of a cathode reactant flowing into the fuel cell stack, a coolant temperature flowing through the fuel cell stack, a pressure of a cathode reactant in the fuel cell stack, and a stoichiometric quantity of cathode reactant flowing into the fuel cell stack.

* * * * *